Sept. 17, 1929.  C. L. MOURFIELD  1,728,503
AUTOMATIC TRAMPER CONTROL MECHANISM
Filed Jan. 24, 1928  3 Sheets-Sheet 1
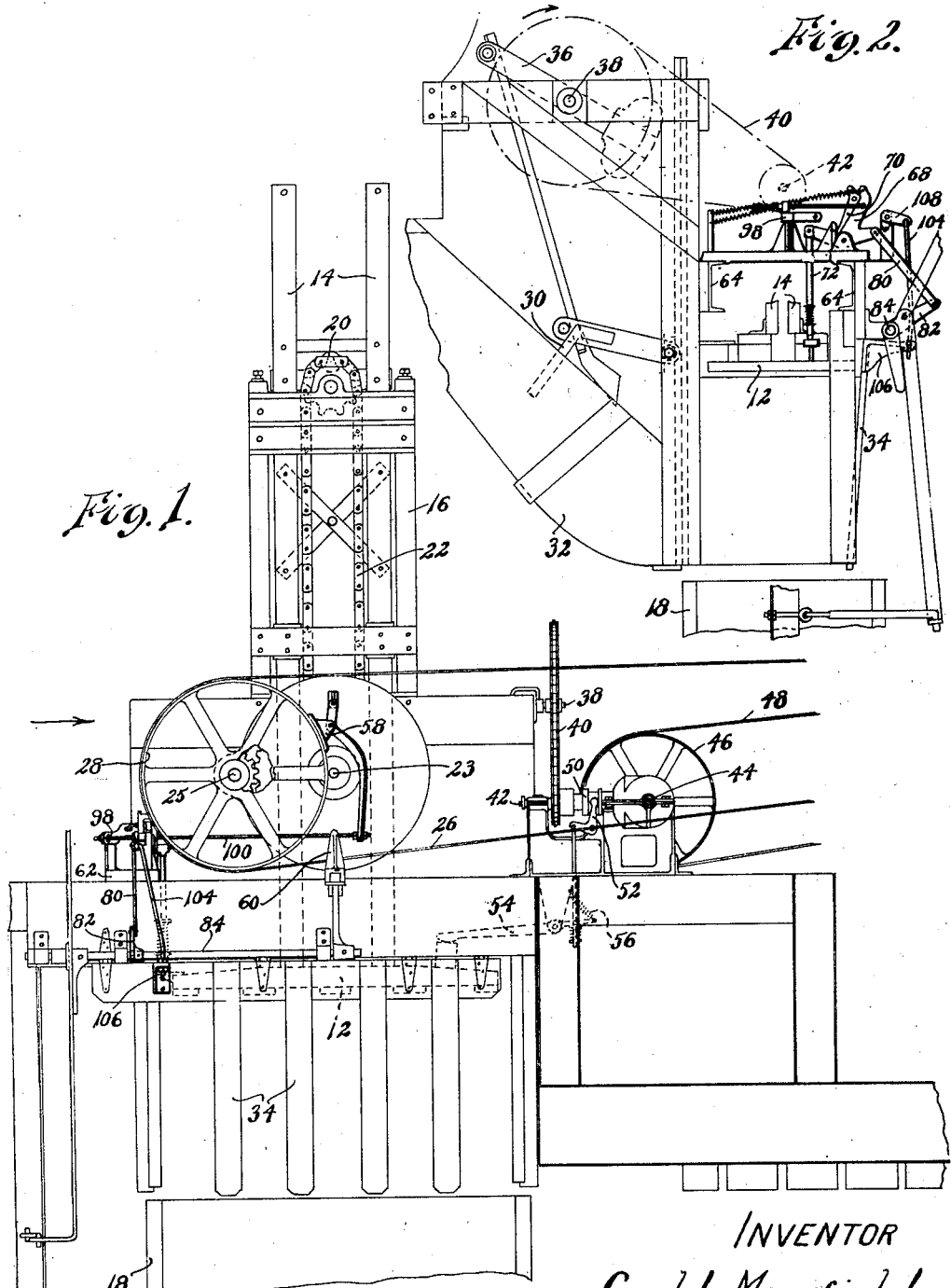
INVENTOR
Carl L. Mourfield.
BY Mitchell, Chadwick & Kent,
ATTORNEYS.

Sept. 17, 1929.   C. L. MOURFIELD   1,728,503
AUTOMATIC TRAMPER CONTROL MECHANISM
Filed Jan. 24, 1928   3 Sheets-Sheet 2
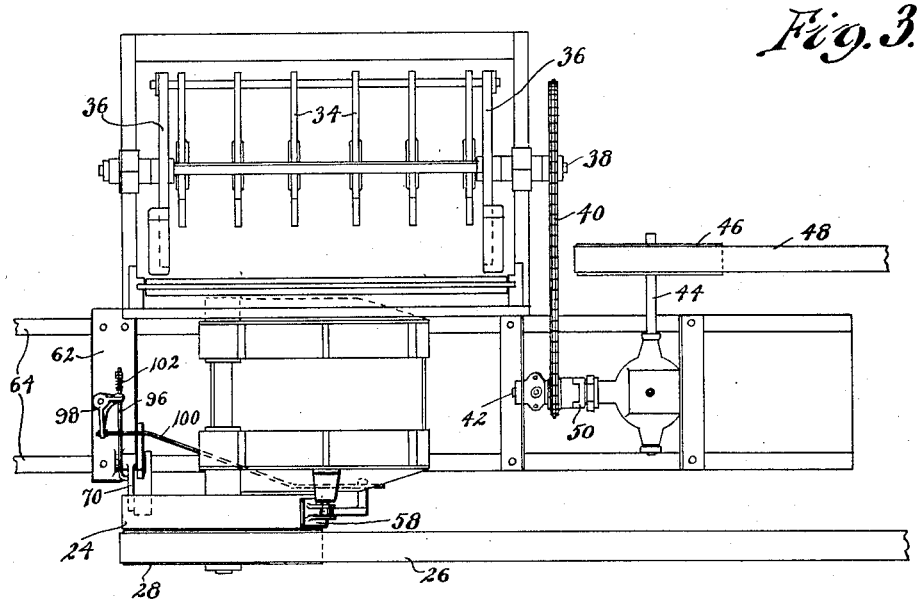
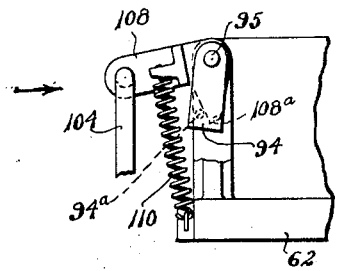
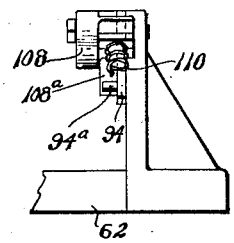
INVENTOR
Carl L. Mourfield
By Mitchell, Chadwick & Kent
ATTORNEYS Sept. 17, 1929.  C. L. MOURFIELD  1,728,503
AUTOMATIC TRAMPER CONTROL MECHANISM
Filed Jan. 24, 1928  3 Sheets-Sheet 3
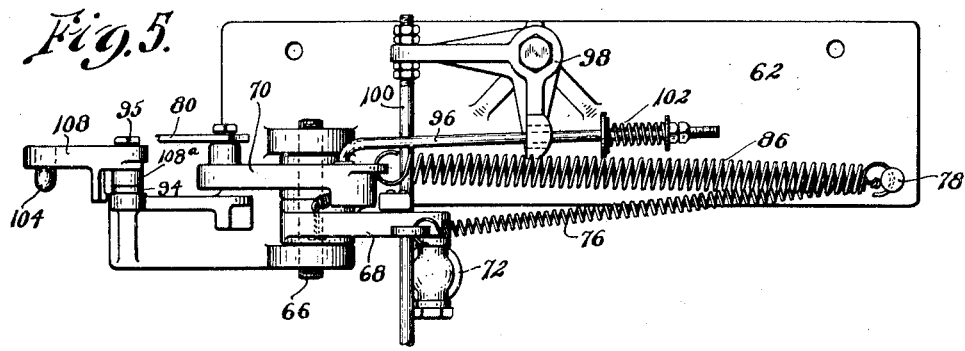
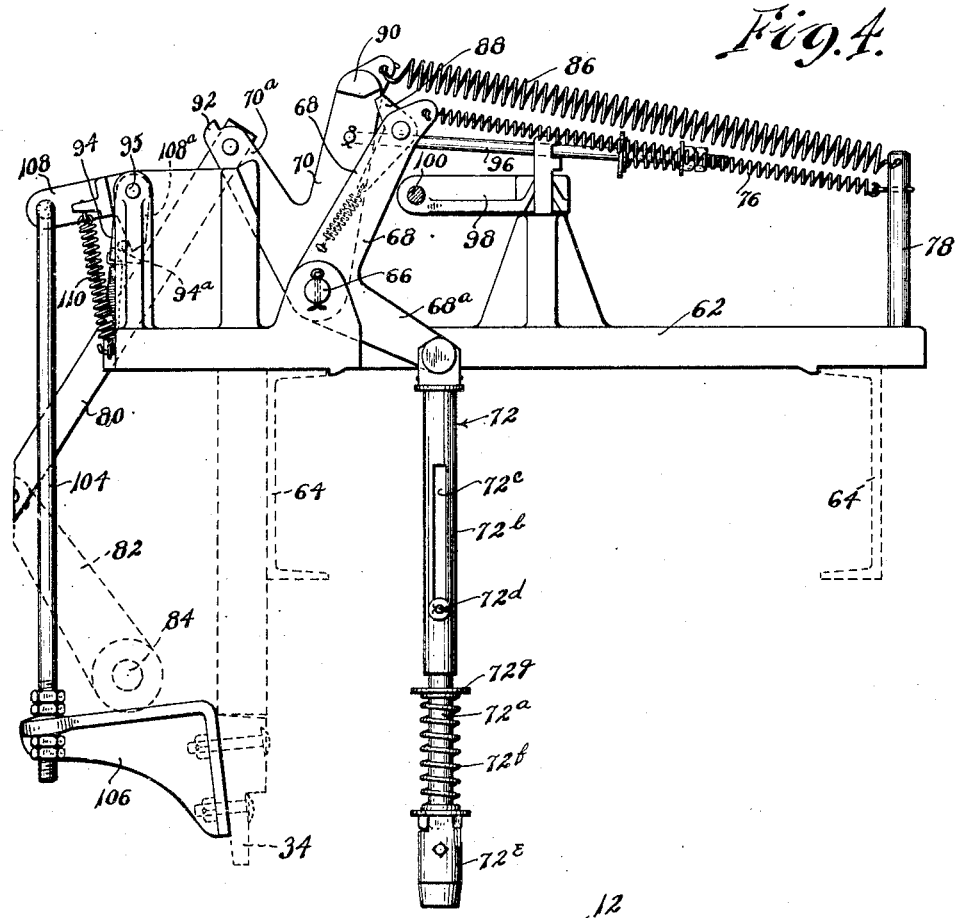
INVENTOR
Carl L. Mourfield
BY Mitchell, Chadwick & Kent
ATTORNEYS.

Patented Sept. 17, 1929

1,728,503

UNITED STATES PATENT OFFICE

CARL L. MOURFIELD, OF HOUSTON, TEXAS, ASSIGNOR TO THE MURRAY COMPANY, OF DALLAS, TEXAS, A CORPORATION OF TEXAS

AUTOMATIC TRAMPER-CONTROL MECHANISM

Application filed January 24, 1928. Serial No. 249,155.

My invention relates to improvements in trampers for cotton presses. More particularly it relates to control mechanism for belt-driven chain-actuated trampers such as may be employed in gin outfits to tramp or pack the loose lint which is fed into the bailing box of a cotton-bailing press, in order to compact the same more or less within said bale box, and to express air from the cotton, preparatory to final compression into a bale by the press. The invention consists in associated brake-actuating and belt-shifting mechanisms which are adapted to operate, in timed relation, with suitable cotton-feeding means, to release a brake, start the tramper, and stop the feeding means, when the feeding means has deposited a charge of lint cotton and to stop the tramper and apply the brake and again start the feeding means, when the tramper has compacted the charge of lint cotton in the bale box and has been withdrawn therefrom.

Trampers of this type embody a reciprocating plunger, carrying a head, which is adapted to be moved into and out of a bale box by means of connections to chains or belts operated by sprockets or pulleys on a belt-driven power shaft. Cotton feeding means, consisting of a rake or pusher, is arranged at one side of the tramper in position to feed cotton into the bale box and a hinged pressure gate is mounted just above the bale box, opposite the cotton feeder. The feed of cotton is continuously intermittent, as is the action of the tramper, the two elements being opposed in action, the feed going on while the tramper head is at rest and the feed ceasing while the tramper head is in action. While the plunger is at rest in its uppermost position, a charge of loose cotton is fed into the bale box, and then the feed of cotton is stopped while the plunger descends into the box and returns to its uppermost position when the feed is again started. All modern trampers are designed to be more or less semi-automatic in action, they having means for stopping the feed of cotton during the time that the tramper plunger is in motion, and for starting the feed of cotton when the plunger comes to rest at the upper limit of its travel. But, so far as I am aware, no one heretofore has provided simple and effective control means for belt-driven chain trampers whereby their action may be entirely automatic, the action of the feeding means, causing the tramper to start at the proper time and the action of the tramper causing the feeding means to start and stop at the proper time, so that the two elements are continuously intermittently operating, by means of an automatic control, until the operation is interrupted by the attendant.

It is an object of my invention to provide control mechanism for the mentioned type of tramper which renders the tramper, as well as its associated cotton feeding mechanisms, entirely automatic in action; and it is a feature that my control means is simple and may be installed at small expense, yet it effectively performs the several allied functions of brake control and belt-shifting at the proper times, and in timed relation with the intermittent feed of the lint cotton into the bailing box.

To these ends my invention provides belt-shifting and brake-actuating means, each of which are controlled, at one stage, by movement of the usual hinged pressure gate under the pressure of a charge of cotton being fed to the bale box by the feed mechanism, and, at another stage, by the movement of the tramper plunger as the plunger nears the upper limit of its travel. And the feed of cotton may be controlled in any customary manner so that the feed is stopped when the plunger is in action, and is started as the plunger comes to upper or retracted position. The pressure gate has means whereby its movement under the pressure of a charge of cotton being fed to the bale box releases a brake from contact with the drive pulley on the tramper power shaft, and actuates a belt-shifter which moves a drive belt to said drive pulley to start the tramper plunger in motion downward. The plunger thereupon will descend into the bale box, compressing the charge of cotton therein, and then will be retracted; and when the plunger head nears its uppermost position it engages and moves an actuating rod disposed above and in the path of the head, which rod has connections to the brake and to the belt-shifter, whereby the drive belt is shifted to a loose pulley and the brake applied to the drive pulley to stop and hold the tramper plunger. At this stage the feed of cotton will be resumed until another charge accumulates in the chute sufficient to cause the pressure gate to be moved. Then the cycle above described will be repeated.

In the accompanying drawings, wherein I have shown my invention applied to a cotton tramper such as is disclosed in United States Patent No. 1,463,186, dated July 31, 1923:—

Figure 1 is an elevation of a belt actuated chain tramper embodying features of the invention;

Figure 2 is an elevation at right angles to Figure 1, with parts broken away, looking in the direction of the arrow in Figure 1;

Figure 3 is a plan thereof;

Figure 4 is an elevation of my control mechanism per se;

Figure 5 is a plan of Figure 4;

Figure 6 is an elevation of the latch mechanism, with a part of the base standard broken away; and Figure 7 is an end view of Figure 6 looking in the direction of the arrow.

Referring to the drawings the tramper plunger, of usual construction, comprises a head 12, and upstanding spaced parallel bars 14 which constitute a stem or shank for the head and this stem is mounted in a suitable guiding frame 16 for reciprocation into and out of a bale box 18 which is arranged below the base of the tramper. In the illustrated embodiment of the invention the movement of the plunger is effected by a roller 20 carried by endless chains 22 which are driven by sprockets (not shown) on a transverse power shaft 23, having gear connection with a stub shaft 25. The stub shaft also carries a drive pulley 24 (Figure 3) by which it may be driven by means of a continuously moving drive belt 26, and carries a loose pulley 28 to which the belt may be shifted to stop rotation of the power shaft and thus to stop movement of the tramper plunger.

The means for intermittent feed of cotton into the bale box 18 may be any of the usual devices, but I have shown a well known rake or pusher type feeder at 30 arranged at one side of the tramper and adapted, when in operation, to push cotton down the chute 32 where it may fall into the bale box. Opposed to the exit of the chute 32 the usual hinged pressure gate is seen at 34 just above the bale box, where the cotton as it accumulates, will bear against it, urged by pusher 30, and will move it by the weight of the cotton and the urge of the feed rake, when a sufficient charge has accumulated. At this stage it is desired to have the plunger move downward into the box to compress the charge of cotton and also it is desirable and usual to have automatic means for stopping the feed of cotton when the plunger starts moving, and for starting the feed again when the plunger returns to its upper position. The rake feeder illustrated is operated by crank arm 36 on shaft 38, rotating in the direction of the arrow, which shaft has a chain drive, as at 40, from a stub-shaft 42, and this stub-shaft is geared to a power shaft 44 which is driven continuously by the pulley 46 and belt 48. A clutch 50 on the stub-shaft 42 permits stopping or starting of the cotton feeding rake by disengaging or engaging the clutch, as the case may be. The illustrated means for automatic operation of the clutch comprises connections between a pivoted clutch-shifter 52 and a lever 54, whose long arm extends into the path of the plunger head 12. A coil spring 56, effective on the short arm of the lever 54, tends always to disengage the clutch. Thus, unless held in engaging position by the tramper head, the clutch will be disengaged by spring 56 and the rake feeder will not be in operation. This upward movement of the long arm of lever 54 therefore shifts the clutch to engaging position where it is held, with the rake in operation, until the plunger starts downward. Then, as the plunger head 12 moves downward, away from lever 54, the coil spring 56 acts to disengage the clutch to stop the rake. All of the foregoing is old in trampers as now made, and constitutes no part of my invention, except in so far as they may be necessary elements to the cooperative continuous automatic tramper action.

My improvements consist in control connections between the pressure gate 34 and a pivoted brake 58 for the tramper drive pulley 24, and between the pressure gate and a belt-shifter 60, whereby movement of the gate under the urge of a charge of cotton piled above the bale box, releases the brake and shifts the drive belt 26 from the loose pulley 28 to the fast or drive pulley 24 to actuate the tramper. And the invention consists further in hanging an actuating rod in the path of the plunger head 12 which is engaged when the latter is nearing its uppermost position on its return from the bale box, and in providing connections from this actuator to the brake 58 and belt-shifter 60 whereby movement upward of the hanging actuating rod, by the plunger head, shifts the belt 26 back to the loose pulley, and applies the brake 58 to the fast or drive pulley 24 to stop the tramper.

The mechanism for accomplishing these functions may best be seen in Figures 4 and 5, and particularly in Figure 4 where parts of the tramper are shown in dotted lines. The base 62 of this mechanism is adapted to be mounted at one side of the tramper plunger on sills 64, and it carries a transverse shaft 66 on which two bell crank levers 68, 70 are mounted loosely side by side. One arm 68a of the lever 68 carries the hanging actuating rod 72 whose free end is in the path of movement of a lug 74 provided on the tramper head 12, and a coil spring 76 is connected to its other arm and to a stationary post 78 on the base 62, which spring tends to return the lever to position, with the free end of the rod 72 well within the range of movement of the lug 74 on the plunger head 12. The rod may be made in two sections, with the lower section 72a telescoping within the upper section 72b, and the upper section is slotted at 72c to receive a pin 72d on the lower section, whereby the relative movement of the sections is limited. A head 72e on the free end of the lower section 72a of the actuating rod provides a shoulder against which the lower end of a coil spring 72f engages, while a washer 72g rests on the upper end of the spring, loosely surrounding the rod 72a just under the lower end of section 72b. Thus, as the head 72e of the actuating rod is engaged and pushed upward, its thrust is yieldingly transmitted to the bell-crank lever 68, thereby allowing for differences of setting of the control mechanism with respect to the upper limit of the plunger's travel, and ensuring against breakage of parts.

The bell-crank lever 70, 70a has arm 70a connected by link 80 to arm 82 on a rockshaft 84, which shaft is mounted just above the pressure gate (see Figure 2) and a coil spring 86 is connected to its other arm 70 and to the post 78, which spring tends to pull the lever yieldingly in direction for the link 80 and arm 82 to rock the shaft 84 in clockwise direction as seen in Figure 4. A spring held pawl 88 is pivoted on lever 68, and when this lever is rocked, as a result of the actuating rod 72 being pushed upward by the lug 74 on plunger head 12, the pawl 88 is adapted to engage a lug 90 on lever 70 whereby that lever is rocked until a lug 92 on arm 70a thereof slips under a latch 94 which is pivoted at 95 upon a standard erected on base 62. The latch 94 holds lever 70 in this position until it is released in a manner later to be described, leaving the lever 68 free to be pulled back, by its spring 76, to its original position as soon as the tramper plunger moves away from the trigger-rod 72. As the lever 70 is moved and latched as above described, the link 80 and arm 82 will rock shaft 84 in counter-clockwise direction as seen in Figure 4, and the belt-shifter 60 which is connected to shaft 84 will be moved in direction to shift belt 26 from the tight pulley 24 to the loose pulley 28, to stop the tramper. Also this movement of lever 70 applies the brake 58 to the tight pulley 24 to hold the tramper plunger elevated. For this purpose the lever 70 is connected by rod 96 to one arm of a horizontal bell-crank lever 98, whose other arm is connected by rod 100 to the brake 58. And a suitable lost motion device 102 may be included in the connection between these levers so that the application of the brake will ocur in proper timed relation with the shifting of belt 26, and so that it will be applied with a yielding presure.

Thus it will be seen that as the tramper plunger moves to its uppermost position, it pushes the rod 72 upward, and the rod moves both the levers 68 and 70. The lever 70 and its connections, and rock shaft 84 to shift the drive belt from tight to loose pulley, and apply the brake whereby the tramper comes to rest and is held in its uppermost position. Lever 70 is latched in the position to which it has been moved, while lever 68 is free to be pulled back by its spring ready to repeat its function, as soon as the plunger head 12 has moved downward.

The means for automatic release of brake 58 and shifting of belt 26 back to the fast pulley operate as a result of movement of the pressure gate 34. To accomplish this, one end of a rod 104 is adjustably connected to the gate as at 106 (Figure 4) while its other end is connected to a lever 108 mounted on the same pivot 95 as is the latch 94. A spring 110 connected to the lever and to the base 62, tends to pull the lever 108 downward and resists movement of the pressure gate, and pulls the lever down after any such movement, to move the gate to its normal position, as soon as the gate is relieved of pressure of cotton. A depending arm 108a on the lever 108 is in position to engage a pin 94a on the latch 94 when the lever is moved upward as a result of movement of the pressure gate, and its engagement with the pin moves the latch and releases the bell-crank lever 70 which then is pulled by its spring 86 back to its original position. This return movement of the lever 70, through its several described connections, releases the brake 58 and rocks shaft 84 to move the belt-shifter 60 in direction to shift belt 26 from the loose pulley 28 to the tight pulley 24, to start the tramper.

Thus, with the plunger 10 in elevated position, cotton will be fed to the bale box 18 until a sufficient charge thereof has accumulated in and above the box to cause the hinged pressure gate 34 to be moved. Then latch 94 is actuated and releases bell-crank lever 70 which is pulled by its spring 86 to release the brake 58 and shift the belt 26 to the drive pulley 24. Then the plunger starts downward, allowing the clutch 50 to be moved by its spring 56 to disengaged position, to stop the cotton feeding mechanism. The plunger proceeds downward into the bale box to compress the charge of cotton therein, and then is retracted; and when nearing its uppermost position it engages the actuating rod 72 pushing it upward, which movement rocks the two bell-crank levers 68 and 70 simultaneously, whereby the belt 26 is shifted onto the loose pulley and the brake 58 is applied to the tight pulley and the lever 70 is latched in position, against the pull of spring 86, ready when the latch is released by the movement of pressure gate 34, to reverse the belt shifter and brake to again start the tramper in motion. Also the plunger engages and actuates the lever 54 to throw the clutch 50 to engaging position, whereby the feed of cotton to the bale box 18 is resumed. The feed will continue until the pressure gate is again moved by a charge of cotton, and then the operative cycle above described will be repeated.

In order to eliminate the need for extreme exactness in manufacture and assemblage of my improved control mechanism, I provide so that the lever 68, 68ᵃ moves the lever 70, 70ᵃ until the latter engages the latch 94 and is held, and then can continue its movement alone for a short distance. To accomplish this I provide a lug 63 on the standard of base 62 which kicks the pawl 88 from engagement with the lever 70, 70ᵃ after the latter said lever is latched. This having been done any further movement in the same direction will be by the lever 68, 68ᵃ alone.

I claim:

1. In a belt driven tramper, a drive shaft for the tramper plunger, provided with fast and loose pulleys; that plunger; an actuating rod hanging above and in the path of the plunger; a belt shifter operatively adjacent the fast and loose pulleys; a brake operatively adjacent the fast pulley; pivoted linkage connecting the actuating rod with the belt shifter and with the brake, to shift the drive belt from fast to loose pulley and to set the brake against the fast pulley, when the plunger reaches its upper position.

2. In a belt driven tramper, a drive shaft for the plunger, provided with fast and loose pulleys; that plunger; an actuating rod disposed above and in the path of the plunger; a belt shifter operatively adjacent the pulleys; a rock shaft having an arm for moving said belt shifter; a lever, having connections with the actuating rod and the rock shaft; a spring or the like constantly tending to move the lever in one direction; a latch, for said lever to hold it against the urge of the spring; and means, connected with said actuating rod to transmit the upward thrust of the rod to said lever to move the lever into engagement with the latch and to rock said rock shaft to shift the belt shifter and move a belt from the fast to the loose pulley.

3. In a belt driven tramper, a drive shaft for the plunger, provided with fast and loose pulleys; that plunger; an actuating rod disposed above and in the path of the plunger; a belt shifter operatively adjacent the pulleys; a brake for the fast pulley; a rock shaft having an arm for moving the brake shifter; a lever having connection with the actuating rod and with the rock shaft and with said brake; a spring or the like constantly tending to move the lever in one direction; a latch for said lever to hold it against the urge of said spring; and means, connected with said actuating rod to transmit the upward thrust of the rod to said lever to move the lever into engagement with the latch and to rock said rock shaft to shift the belt shifter to move a belt from the fast to the loose pulley and to apply said brake to the fast pulley.

4. In a belt driven tramper, a drive shaft for the plunger, provided with fast and loose pulleys; that plunger; an actuating rod disposed above and in the path of said plunger and connected to a lever; that lever, having link connections with a rock shaft; a belt shifter operatively adjacent the pulleys; the rock shaft, having an arm for moving said belt shifter; a spring or the like constantly tending to move the lever in one direction; a latch for said lever to hold it against the urge of the spring; means, connected with said actuating rod, to transmit the upward thrust of the rod to said lever to move the lever into engagement with the latch and to rock said rock shaft to shift the belt shifter to move a belt from the fast to the loose pulley; a pressure gate above a bale box and beneath the tramper; link connections between the gate and the latch, to trip said latch on operative movement of the gate, to permit the spring to rock the rock shaft to shift the belt shifter and move a belt from the loose to the fast pulley.

5. In a belt driven tramper, a drive shaft for the plunger, provided with fast and loose pulleys; that plunger; an actuating rod disposed above and in the path of said plunger and connected to a lever; that lever, having link connections with the rock shaft; a belt shifter operatively adjacent the pulleys; a brake for the fast pulley; the rock shaft, having an arm for moving said belt shifter; a spring or the like constantly tending to move the lever in one direction; a latch for said lever to hold it against the urge of the spring; means, connected with said actuating rod, to transmit the upward thrust of the rod to said lever to move the lever into engagement with the latch and to rock said rock shaft to shift the belt shifter to move a belt from the fast to the loose pulley and apply the brake; a pressure gate above a bale box and beneath the tramper; link connections between the gate and the latch, to trip said latch on operative movement of the gate to permit the spring to rock the rock shaft to release the brake and to shift the belt shifter and move a belt from the loose to the fast pulley.

Signed at Dallas, Texas, this 10th day of January, 1928.

CARL M. MOURFIELD.